(12) United States Patent
Ellringmann et al.

(10) Patent No.: US 8,152,944 B2
(45) Date of Patent: Apr. 10, 2012

(54) PRESSURE-SENSITIVE ADHESIVE TAPES FOR BONDING PRINTING PLATES

(75) Inventors: Kai Ellringmann, Hamburg (DE);
Kristin Kerber, Hamburg (DE);
Thorsten Krawinkel, Hamburg (DE);
Jochen Fiencke, Hamburg (DE)

(73) Assignee: tesa SE, Hamburg (DE)

( * ) Notice: Subject to any disclaimer, the term of this patent is extended or adjusted under 35 U.S.C. 154(b) by 3 days.

(21) Appl. No.: 12/437,629

(22) Filed: May 8, 2009

(65) Prior Publication Data

US 2009/0277562 A1     Nov. 12, 2009

(30) Foreign Application Priority Data

May 9, 2008   (DE) .......................... 10 2008 023 023
May 15, 2008  (DE) .......................... 10 2008 023 758

(51) Int. Cl.
| | |
|---|---|
| C09J 7/02 | (2006.01) |
| B32B 7/12 | (2006.01) |
| B32B 37/12 | (2006.01) |
| B32B 3/26 | (2006.01) |

(52) U.S. Cl. .......................... 156/60; 428/354; 428/317.3
(58) Field of Classification Search .................... 156/60; 428/354, 317.3
See application file for complete search history.

(56) References Cited

U.S. PATENT DOCUMENTS

| | | | |
|---|---|---|---|
| 3,983,287 A | 9/1976 | Goossen et al. | |
| 4,380,956 A | 4/1983 | Elworthy | |
| 4,574,697 A | 3/1986 | Feeley | |
| 4,574,712 A | 3/1986 | David | |
| 5,476,712 A | 12/1995 | Hartman et al. | |
| 5,613,942 A | 3/1997 | Lucast et al. | |
| 5,695,837 A | 12/1997 | Everaerts | |
| 6,655,281 B1 * | 12/2003 | Jordan et al. | 101/382.1 |
| 2005/0064181 A1 * | 3/2005 | Blank et al. | 428/354 |
| 2006/0257650 A1 * | 11/2006 | Dollase et al. | 428/355 R |

FOREIGN PATENT DOCUMENTS

| | | |
|---|---|---|
| DE | 2 137 662 A | 2/1972 |
| DE | 39 35 097 A1 | 4/1991 |
| DE | 43 40 297 | 6/1995 |
| DE | 10 218 570 B4 | 11/2003 |
| DE | 10 359 973 A1 | 7/2005 |
| EP | 0 206 760 | 12/1986 |
| EP | 0 342 808 A1 | 11/1989 |

(Continued)

OTHER PUBLICATIONS

Van Drumpt et al; Journal of Polymer Science, Polymer Chemistry Edition 14 (1976) 1495-1511.

(Continued)

*Primary Examiner* — Katarzyna Wyrozebski Lee
*Assistant Examiner* — Daniel Lee
(74) *Attorney, Agent, or Firm* — Norris McLaughlin & Marcus, PA (57) ABSTRACT

Composition for preparing a crosslinked pressure-sensitive adhesive, comprising a pressure-sensitive adhesive comprising a polymer component based on one or more monomers having at least one ethylenically unsaturated bond and for which the glass transition temperatures $T_g$ of the corresponding homopolymers are at least 0° C., some of the monomers having at least one ethylenically unsaturated bond also having at least one carboxyl group, acrylic esters and/or methacrylic esters which are each selected such that the glass transition temperatures $T_g$ of the corresponding homopolymers are not more than −20° C., at least one resin component having a softening point of at least 100° C., and at least one difunctional or polyfunctional crosslinker.

19 Claims, 1 Drawing Sheet

| | FOREIGN PATENT DOCUMENTS | | |
|---|---|---|---|
| EP | 0 338 724 B1 | 2/1993 |
| EP | 0 357 204 B1 | 10/1993 |
| EP | 0 303 430 B1 | 12/1993 |
| EP | 0 352 901 B1 | 8/1995 |
| EP | 0 796 906 A2 | 9/1997 |
| EP | 0 713 498 B1 | 9/1999 |
| EP | 1 302 521 A2 | 4/2003 |
| EP | 1 590 383 | 11/2005 |
| EP | 0 816 462 B1 | 2/2006 |
| EP | 2 226 371 A2 | 9/2010 |
| EP | 2 233 546 A2 | 9/2010 |
| GB | 1 356 163 | 6/1974 |
| GB | 1 441 278 | 6/1976 |
| GB | 1 533 431 | 11/1978 |
| GB | 2 199 039 A | 6/1988 |
| WO | 94 00525 | 1/1994 |
| WO | 96 05 248 A1 | 2/1996 |
| WO | 97 27 262 A1 | 7/1997 |
| WO | 97 31 076 A1 | 8/1997 |
| WO | 00 06662 | 2/2000 |
| WO | 00 77 117 A1 | 12/2000 |
| WO | 01 057 152 A | 8/2001 |
| WO | 02 079336 A1 | 10/2002 |
| WO | 03 020 841 | 3/2003 |
| WO | 03 057 497 A1 | 7/2003 |
| WO | 03 070 849 A | 8/2003 |
| WO | 2004 083 333 A | 9/2004 |
| WO | 2005 080 521 A | 9/2005 |
| WO | 2006 109 993 A | 10/2006 |
| WO | 2006 110 419 A | 10/2006 |
| WO | 2006 132 500 A | 12/2006 |
| WO | 2007 043 822 A | 4/2007 |
| WO | 2007 046 647 A | 4/2007 |
| WO | 2007 061 242 A | 5/2007 |
| WO | 2007 069 856 A | 6/2007 |
| WO | 2007 144 255 A | 12/2007 |
| WO | 2008 088 115 A | 7/2008 |

OTHER PUBLICATIONS

Fox, Bull. Am. Phys. Soc. 1 (1956) 123.
Houben-Weyl, Methoden der Organischen Chemie, vol. E 19a, pp. 60-147.
Asahara J, et al.: "Cross-linked acrylic pressure-sensitive adhesives. 1. Effect of the cross-linking reaction on the peel strength"; J. Applied Polymer Science 87 (2003) 1493-1499.
Czech Z. u. Urbala M: "UV-crosslinked pressure sensitive adhesive systems containing unsaturated ethers"; Polymery 2007, 52, nr. 6, 438-442;.
Czech Z.: "Synthesis and cross-linking of acrylic PSA systems"; J. Adhesion Sci. Technol. 21 (No. 7) (2007), 625-635.
Czech Z.: "Crosslinking of pressure sensitive adhesive based on water-borne acrylate"; Polymer International 52 (2003) 347-357.
Czech Z.: "Synthesis of new solvent-borne acrylic pressure-sensitive adhesives with low shrinkage"; Polymeri 50 (2005) Nr. 11-12, 831-838.
Czech Z u. Wesolowska M.: "Development of solvent-free acrylic pressure-sensitive adhesives"; Eur. Polymer J. 43 (2007) 3604-3612.
Milker R u. Czech Z.: "UV and thermally crosslinkable solvent-free acrylic PSA systems"; PSTC Pressure Sensitive Tape Counsil, Tech XXVII Technical Conference Speaker; S. 237-258.
Small Dj u. Courtney PJ: "Fundamentals of Industrial Adhesives"; Advanced Materials & Processes, May 2005, 44-47.

* cited by examiner

PRESSURE-SENSITIVE ADHESIVE TAPES FOR BONDING PRINTING PLATES

The invention relates to a composition for preparing a pressure-sensitive adhesive (PSA), to a corresponding PSA, and to a double-sided adhesive tape equipped with this PSA, intended more particularly for the bonding of printing plates, said PSA possessing a very low level of peel increase on polar surfaces, being readily repositionable, and, after bonding to the printing cylinder, exhibiting low levels of edge lifting of the printing plate and of the plate-mounting tape/printing plate assembly.

BACKGROUND OF THE INVENTION

Within the printing industry there is a variety of techniques known for transferring designs to paper, for example, by means of print originals. One possibility is that known as flexographic printing. One embodiment of flexographic printing, in turn, is the use of multi-layered photopolymer printing plates having a flexible substructure, this type of printing having been part of the prior art for some considerable time. These printing plates are composed of a plurality of layers of different polymeric materials each with specific functions. For example, the "Nyloflex ACE" printing plates from the Flint Group company have at least two layers, namely a light-sensitive relief layer and, beneath it, a stabilizing film.

In the flexographic printing process, flexible printing plates are bonded to printing cylinders. This adhesive bonding is generally carried out using double-sided pressure-sensitive adhesive tapes (PSA tapes), on which very stringent requirements are imposed. For the printing process, the PSA tape is required to have a certain hardness but also a certain elasticity. These properties must be set very precisely in order that the printed image produced yields the desired result in accordance with the requirements. Further stringent requirements are imposed on the PSA, where the bond strength must likewise be sufficiently high that the printing plate does not detach from the double-sided PSA tape, or the PSA tape from the cylinder. This must be so even at elevated temperatures of 40 to 60° C. and at relatively high printing speeds. In addition to this property, however, the PSA is also required to possess reversible adhesion properties, since frequently it is necessary to bond printing plates and then detach them again for repositioning. This detachability ought to exist even for an adhesive bond over a relatively long period of time (up to 6 months). Moreover, it is desired that the PSA tape and especially the printing plate can be removed again without their destruction, i.e. without great application of force, since usually the printing plates are used a number of times. Furthermore, there should be no residues on the printing plate or on the cylinder. In summary, then, very stringent requirements are imposed on the double-sided PSA tapes that are suitable for this utility.

U.S. Pat. No. 4,380,956 A describes a process for fixing a printing plate for the flexographic printing process. PSAs are used for that process too, but have not been specified in any greater detail.

GB 1,533,431 A claims a double-sided PSA tape including an elastomeric layer which in turn has been foamed by fragile air bubbles. The air bubbles are destroyed under pressure during the flexographic printing application.

U.S. Pat. No. 4,574,697 A claims double-sided PSA tapes comprising as their carrier material a flexible polyurethane foam affixed to a PET (polyethylene terephthalate) film. The external layers are composed of PSAs. The PSA tape described is said to be reversible and to be removable from the printing cylinder and from the printing plate. A similar product structure has been described in EP 0 206 760 A. There the flexible foam carrier used was a polyethylene foam.

U.S. Pat. No. 4,574,712 A describes, in analogy to U.S. Pat. No. 4,574,697 A, a similar PSA tape construction. Here there is a restriction on the PSAs to the effect that the bond strength to the printing plate and to the printing cylinder should be lower than to the carrier film and the carrier foam.

U.S. Pat. No. 3,983,287 A describes a laminate whose carrier material comprises an incompressible elastomer. Compressibility is achieved by means of beads which are destroyed under pressure and which therefore produce flexibility.

U.S. Pat. No. 5,613,942 A describes PSA tapes which are especially suitable for bonds on wet surfaces. It is also said that such PSA tapes are suitable for bonding printing plates.

U.S. Pat. No. 5,476,712 A likewise describes a double-sided PSA tape which is used in the flexographic printing process. This PSA tape comprises, in turn, a thermoplastic elastomer, the structure present in this case being a cellular structure produced by means of expanding microparticles.

EP 1 590 383 A describes PSA tapes for bonding printing plates, and processes for producing them. The invention relates to PSA tapes and to a process for preparing PSAs for bonding printing plates, the PSA possessing a very low level of peel increase on polar surfaces, being readily repositionable and, after bonding to the printing cylinder, being said to exhibit little edge lifting of the printing plate and of the plate-mounting tape/printing plate assembly.

In the cases referred to above, a very large number of different PSAs are employed. Natural rubber adhesives possess good tack properties but lack great shear strength at room temperature and age as a result of degradation via the double bonds present in the polymer. SIS-based or SEBS-based PSAs are generally very soft and tacky and tend to soften at high temperatures as well. If the printing plate is bonded to the printing cylinder under tension using an SIS or SEBS PSA, the printing plate tends to detach, despite the fact that the bond strength is high. Acrylate PSAs, in contrast, are more suitable for bonding printing plates to printing cylinders, but have to be crosslinked in the preparation process after the coating operation. Moreover, as a result of the large number of ester groups and the resulting polarity, these PSAs have a tendency towards a high level of peel increase. As a result, the printing plates can be removed only with very high application of force. Moreover, the PSA must have a certain hardness in order that the printing plates, after bonding to the printing cylinder, do not tend towards edge lifting over a prolonged time period.

The phenomenon of edge lifting is a problem which is known for virtually all current commercial adhesive printing plate tapes, and results from the fact that the flexible printing plates, after the operation of bonding to a printing cylinder—and the deformation this inevitably involves—exhibit a propensity to resile into the planar area. The propensity towards edge lifting is dependent on parameters which include the cylinder diameter, the thickness and nature of the printing plate, the presence of a printing plate margin which is not used for printing (and which in that case is thinner and exhibits lower resilience forces), on the print design at the plate margin (if the printing plate is printed over the full area it typically has the highest resilience forces), on the cleaning of the reverse of the printing plate prior to mounting on the cylinder, on the pressure applied to the plates in the course of bonding, and on further parameters. Where two or more printing plates are used simultaneously, the requirements imposed on the gap between the printing plates, which are typically bonded seamlessly, become ever greater, particularly if large-format prints are to be produced in which the transition is to be invisible. Flexographic printing (i.e. printing using printing plates) is increasingly competing with other processes such as that of gravure printing, for example, and so the aforementioned requirements are gaining in significance. Besides the fact that the gap must be increasingly small (less visible for the printed image), there is also no longer a possibility of leaving a non-print margin. Printers are attempting to master these problems at present by carrying out printing processes with two or more worksteps, but this entails considerable inconvenience and additional costs.

It is an object of the invention, therefore to offer a pressure-sensitive adhesive which is outstandingly suitable for the bonding of flexible printing plates, and also to provide a pressure-sensitive adhesive tape featuring such a pressure-sensitive adhesive, so that even after prolonged storage, under slightly elevated temperatures there is no edge lifting or at least greatly reduced edge lifting, when a flexible printing plate is bonded to a printing cylinder using such a pressure-sensitive adhesive tape.

SUMMARY OF THE INVENTION

The invention accordingly provides a composition for preparing a crosslinked pressure-sensitive adhesive, comprising
A. a pressure-sensitive adhesive comprising
  A1). 60% to 90% by weight of a polymer component based on
    a) 5% to 25% by weight (based on the polymer component) of one or more compounds having at least one ethylenically unsaturated bond, the monomers being each selected such that the glass transition temperatures $T_g$ of the corresponding homopolymers are at least 0° C., some of the compounds having at least one ethylenically unsaturated bond also having at least one carboxyl group,
    b) 75% to 95% by weight (based on the polymer component) of acrylic esters and/or methacrylic esters which are each selected such that the glass transition temperatures $T_g$ of the corresponding homopolymers are not more than −20° C.;
  A2). 10% to 40% by weight of at least one resin component having a softening point of at least 100° C.,
and
B. at least one difunctional or polyfunctional crosslinker, the at least one crosslinker being present in an amount such that the chemical-amount ratio $V=n_Z/n_P$ of the amount $n_Z$ of the crosslinking-active centres of the crosslinker to the theoretical amount $n_P$ of the macromolecules of the polymer component A1 possesses a value between 1.5 and 2.5,
the amount $n_Z$ of the crosslinking-active centres of the crosslinker being given by the mass $m_V$ of the crosslinker, divided by the molar mass $M_V$ of the crosslinker, multiplied by the number f of the crosslinking-active centres per crosslinker molecule, i.e. $n_Z=f \cdot m_V/M_V$
and the theoretical amount $n_P$ of the macromolecules of the polymer component A1 being given by the mass $m_P$ of the polymer component in the pressure-sensitive adhesive, divided by the number average molar mass $M_{n,P}$ of this component, i.e. $n_P=m_P/M_{n,P}$.

DETAILED DESCRIPTION

Crosslinkers selected are more particularly those compounds which are capable of constructing covalent, ionic or coordinative bonds. In one very preferred procedure, the bonds can be formed without the supply of actinic radiation. The functionality of the crosslinker refers in the case of reactive crosslinkers, to the number f of the functional groups (e.g. the NCO group in isocyanate) which are able under crosslinking conditions to lead to the formation of a covalent bond to a polymer molecule. In the case of crosslinkers based on metal chelates (for example aluminium(III) acetylacetonate with 3 coordination sites) the number f is understood to refer to the available coordination sites via which, under the crosslinking conditions, it is possible for one—more particularly coordinated—bond to be constructed to a polymer molecule.

Glass transition temperatures are reported as results from quasi-static methods such as, for example, differential scanning calorimetry (DSC).

The softening points have been reported, in an analogy to DIN EN 1427:2007 with the resin under investigation, instead of bitumen; for softening temperatures of more than 150° C., procedure 8.1 b) from that specification is employed analogously.

Crosslinking of this composition produces a PSA which is outstandingly suitable for use for bonding flexible printing plates to printing cylinders or printing sleeves, particularly by equipping at least one side of a double-sided adhesive tape to be used for this utility with said PSA. The crosslinking ought in this case to be carried out preferably to complete conversion of the crosslinker, in particular to a crosslinker conversion of at least 80%, better still to a crosslinker conversion of at least 90%.

Outstandingly suitable crosslinkers (component B) in accordance with the invention are metal chelates, such as, more particularly, aluminium or titanium chelates, polyfunctional isocyanates, polyfunctional amines, polyfunctional alcohols or polyfunctional epoxides.

The initial mass $m_V$ of the crosslinker advantageously employed is given, with the definitions of the corresponding values inserted, by the initial mass of the polymer component $m_P$ and its number-average molar mass $M_{n,P}$ as follows:

$$m_V = \frac{V \cdot m_P \cdot M_V}{M_{n,P} \cdot f}$$

The crosslinking density for the crosslinked PSA is in good approximation a density which corresponds on average to 1.5 to 2.5 crosslinking sites per macromolecule of the polymer component, especially when the crosslinking reaction is carried out up to a largely complete conversion.

In accordance with the invention it is also possible to use two or more crosslinkers. If two or more crosslinkers are used, particularly crosslinkers of different functionality, the definition given in claim 1 for the ratio V must be applied:

$V=n_Z/n_P$, where $n_Z$ is the chemical amount, summed over all of the crosslinkers of the crosslinking-active centres:

$n_Z=f_1 \cdot m_{V,1}/M_{V,1}+f_2*m_{V,2}/M_{V,2}$ where the index 1 denotes the values for the first crosslinker, 2 those for the second crosslinker, etc.

As monomers in the sense of component A1)a) having at least one ethylenically unsaturated bond, which are selected such that the glass transition temperatures $T_g$ of the corresponding homopolymers are at least 0° C., it is possible, in the sense of this component, to use, in particular, all compounds with vinylic functionalization which are copolymerizable with component A1)b) and which meet the corresponding glass transition temperature condition; they may in particular also serve for adjusting the properties of the resultant PSA. Monomers stated by way of example for the component A1)a) are as follows:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethyl-cyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinylisobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyreneethyl methacrylate (molecular weight Mw of 4000 to 13 000 g/mol), poly(methyl methacrylate)ethyl methacrylate (Mw of 2000 to 8000 g/mol).

Monomers in the sense of the component A1)a) having at least one ethylenically unsaturated bond, which are chosen such that the glass transition temperatures $T_g$ of the corresponding homopolymers are at least 0° C. and which have at least one carboxyl group, are preferably selected from the group encompassing acrylic acid and/or methacrylic acid, with acrylic acid being used with particular preference.

Monomers in the sense of the acrylic esters and/or methacrylic esters of component A1)b) are more particularly plasticizing monomers and/or apolar monomers.

For these monomers it is preferred to use acrylic monomers which comprise acrylic and methacrylic esters with alkyl groups, consisting of 4 to 14 C atoms, preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate, 2-ethylhexyl methacrylate, for example.

With particular advantage the polymer component of the PSA of the invention has a number-average molar mass $M_{n,P}$ of between about 30 000 and about 600 000 g/mol, preferably between 40 000 and 400 000 g/mol, more preferably between 50 000 g/mol and 300 000 g/mol.

The figures for the number-average molar mass $M_{n,P}$ and the polydispersity PD in this specification refer to the values determined by gel permeation chromatography (see Experimental Section).

The PSA of the invention and, accordingly, the composition for its preparation (i.e. prior to crosslinking) is admixed in accordance with the invention with at least one tackifier resin (component A2). In principle it is possible to use all of the resins that are soluble in the polymer component and whose softening point is, as outlined above, at least 100° C. Suitable tackifier resins encompass, among others, rosin and derivatives of rosin (rosin esters, including rosin derivatives stabilized by disproportionation or hydrogenation, for example), polyterpene resins, terpene-phenolic resins, alkylphenol resins, aliphatic, aromatic and aliphatic-aromatic hydrocarbon resins, to name but a few. Resins primarily selected are those which are preferably compatible with the polymer.

Optionally it is possible for the PSA to be admixed with additives such as plasticizers, fillers (e.g. fibres, carbon black, zinc oxide, titanium dioxide, chalk, hollow or solid glass beads, microbeads made of other materials, silica, silicates), nucleators, expandants, compounding agents and/or ageing inhibitors in the form, for example, of primary and secondary antioxidants or in the form of light stabilizers.

The PSA systems of the invention are distinguished by meeting the stated profile of requirements and having in particular the following advantages:
  multiple reusability (repositionability) of the PSA tapes,
  reversibility on a variety of surfaces,
  satisfactorily residue-free detachability from the substrate,
  low peel increase even on polar surfaces,
  minimized edge lifting, or none at all, after bonding on the printing cylinder.

The PSA has a glass transition temperature, $T_g$, which is below the application temperature. The application temperature is guided in particular by the requirements of the printing industry; advantageously the PSA has a glass transition temperature $T_g$ which is lower than room temperature.

To obtain the polymer glass transition temperature $T_g$ in accordance with the comments made above and below, the monomers are very preferably selected in such a way and the quantitative composition of the monomer mixture advantageously chosen in such a way that the polymer has the desired $T_g$ in accordance with the equation below (in analogy to the Fox equation; cf. T. G. Fox, Bull. Am. Phys. Soc. 1 (1956) 123).

$$\frac{1}{T_g} = \sum_n \frac{w_n}{T_{g,n}}$$

In this equation, n represents the serial number of the monomers used, $w_n$ represents the mass fraction of the respective monomer n (% by weight) and $T_{g,n}$ represents the respective glass transition temperature of the homopolymer of each of the monomers n in K.

A further preferred characteristic is that the polymer chains are present very preferably in a branched state as graft polymers.

With particular advantage the polymers of the polymer component may be prepared in a two-stage process. The process encompasses the polymerization of a monomer mixture comprising the parent monomers (polymer component A1) and, in addition, a polymerization process for preparation that uses at least two thermally decomposing initiators having a grafting activity of $\epsilon<5$ and of $\epsilon>0$, where first linear polymerization takes place with $\epsilon<5$ and then preparation of graft polymers takes place with $\epsilon>10$. In a subsequent step, advantageously, the crosslinking is carried out with addition of the crosslinkers in the amount described above.

For preparing the copolymers of the invention it is possible in principle to use all free-radical or free-radically controlled polymerizations, including combinations of different polymerization processes. Besides conventional free radical polymerization, mention may be made, for example, without making any claim to completeness, of ATRP, nitroxide/TEMPO-controlled polymerization or the RAFT process, in other words, more particularly, those processes which allow control of the chain lengths or of the polymer architecture.

As free-radical initiators for free-radical polymerization it is possible to use all of the customary initiators that are known for this purpose for acrylates. The production of C-centred free radicals is described in Houben-Weyl, Methoden der Organischen Chemie, Vol. E 19a, pp. 60-147. These methods can be employed in analogy. Examples of free-radical sources are peroxides, hydroperoxides and azo compounds; some—non-exclusive—examples of typical free-radical initiators that may be stated here include potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate and benzpinacol. In one very preferred variant, the initiators are added in two or more stages, so that the conversion is raised to above 90%. In this way the residual monomer content remaining in the polymer can be lowered to below 10% by weight: a low residual monomer content improves considerably the technical properties of the polyacrylate for the adhesive bonding of printing cylinders.

The initiators used at the beginning are preferably selected such that they have a low tendency to form side chains in the polymers; their grafting activity is preferably below a value of $\epsilon<5$ at the temperature of the reaction mixture when the initiator is added. The absolute grafting activity (crosslink efficiency) is defined as the number of chemical side-chain formations per 100 mol units of decomposed initiator. In analogy to van Drumpt and Oosterwijk [Journal of Polymer Science, Polymer Chemistry Edition 14 (1976) 1495-1511] it is possible to specify a value for this number by determining the dimers in a defined solution of the initiator; see also DE 43 40 297 A1:

A precise 0.1 molar solution of the initiator is decomposed in n-pentadecane under an He atmosphere. The reaction time is chosen so as to correspond to ten times the half-life of the respective initiator at the selected temperature. This ensures virtually complete decomposition of the initiator. Subsequently the fraction of dimeric pentadecane formed is measured by means of GLC. The percentage fraction $\epsilon$ is reported as a measure of the grafting activity. Typically the reaction temperature is selected such that the half-life of the test initiator at this temperature is 15 minutes. High $\epsilon$ values for the grafting activity signify a high tendency on the part of the initiator to form side chains in the polymerization; small $\epsilon$ values, in contrast, result in preferably linear polymers.

In one preferred procedure of the process the process sequence looks as follows:
- the reaction solution used is an at least 50% strength solution of the monomers with addition of the initiator having a value of $\epsilon<5$,
- in a temperature range from 50° C. to 90° C. the free-radical polymerization is carried out,
- during the polymerization an initiator for free-radical polymerization with a low tendency to form side chains (grafting activity $\epsilon<5$ at the instantaneous reaction temperature) is used for re-initiation at least once,
- if desired, the reaction is controlled by diluting the reaction solution, according to the viscosity of the polymer,
- a controlled re-initiation takes place with up to 2% by weight, based on the monomer mixture, of an initiator having an increased tendency to form side chains (grafting activity $\epsilon>10$ at the instantaneous reaction temperature),
- the polymerization is carried out up to a conversation rate of >90%, preferably >95%.

Preferred initiators with a low $\epsilon$ value ($\epsilon<5$) are those whose free radicals, on account of their low energy content, cause no hydrogen abstraction or only sporadic hydrogen abstraction on the polymer chains. Preference here is given to the use, for example, of azo initiators such as azoisobutyronitrile or its derivatives, an example being 2,2-azobis(2-methylbutyronitrile) (Vazo67®, DuPont).

Initiators with a high side-chain formation tendency (high $\epsilon$ value >10) produce high grafting yields even at relatively low temperatures. Particular preference here is given to using bis(4-tert-butylcyclohexyl) peroxydicarbonate (Perkadox 16®, Akzo Chemie), dibenzoyl peroxide or the like.

The polymerization can be carried out in the presence of an organic solvent or in the presence of water or in mixtures of organic solvents and/or water. Solvents which can be used for the polymerization include all solvents that are suitable or commonly used for free-radical polymerizations; particularly appropriate are acetone, ethyl acetate, benzine, toluene or any desired mixtures of these solvents.

It is preferred to use as little solvent as possible. The polymerization time, dependent on conversion rate, temperature and initiation, is between 6 and 48 h.

The invention further relates to a double-sided adhesive tape for fixing printing plates, especially multi-layered photopolymer printing plates, to printing cylinders or printing sleeves.

In one advantageous embodiment of the adhesive tape of the invention said tape is constructed at least of a carrier layer and of one layer of pressure-sensitive adhesive on each of the two sides of the carrier layer.

In particular the carrier of the adhesive tape of the invention is a film, a foam or a composite of two or more films, two or more foams or at least one film and at least one foam, the corresponding carrier or assembly bearing double-sidedly self-adhesive coatings, and at least the side facing the printing plate being equipped with the PSA of the invention. The PSA of the invention can be used advantageously for both layers of PSA.

Outstandingly suitable in accordance with the invention is a double-sided adhesive tape, which comprises a foamed carrier, a polymer film on one side of the foamed carrier, and a layer of a PSA on both sides of the adhesive tape, at least one of the external layers of PSA being a crosslinked PSA of the invention, and more particularly both layers of PSA being PSAs of the invention.

Where a composite of at least one film and at least one foamed material is used as carrier, these carrier layers, in one advantageous procedure, can be laminated together by an adhesive to produce a carrier assembly. In a further embodiment, the layers may be joined to one another by heat sealing. To produce the carrier assembly an alternative possibility is to employ the other methods known in the art for extensively joining two layers, particularly of polymeric nature.

On the side of the PSA tape facing the printing cylinder it is possible with advantage to use the PSA of the invention, although in principle here it is also possible to use other PSAs known to a person skilled in the art. Suitability is possessed accordingly, for example, by rubber-based PSAs, synthetic rubber PSAs, PSAs based on polysilicones, polyurethanes, polyolefins or polyacrylates.

As film-based carriers it is possible to employ the materials that are familiar to a person skilled in the art, especially polyesters, polyethylene terephthalate (PET), polyethylene (PE), polypropylene (PP), biaxially oriented polypropylene (BOPP), polyvinyl chloride (PVC) etc. This listing should not be understood as being exhaustive. Particular preference is given to using a form of polyethylene terephthalate.

Foam carriers suitable with particular advantage are polymer foams, the carrier foams being composed, for example, of polyolefins, more particularly polyethylene or polypropylene, of polyurethanes or of polyvinyl chloride.

Where foams are used as carrier materials it is especially advantageous additionally to provide at least one stabilizing carrier on at least one side of the foamed carrier, to produce a carrier assembly as outlined above. The stabilized carrier may be more particularly a paper or a film, especially a film of polyester, polyethylene terephthalate, polyethylene, polypropylene, biaxially oriented polypropylene or polyvinyl chloride. Advantageously it is possible for a stabilizing carrier to be provided on both sides of the foam carrier.

In general it is possible to improve the PSA anchorage by roughening the carrier material. One way of roughening and of chemically modifying the polymer structure is via the wet-etching of the carrier material. As well as etching, pretreatment may take place in other ways as well.

For instance, the carrier materials may be pretreated chemically and physically for the purpose of improving the anchorage. For physical treatment, the film is treated preferably by flame or corona or plasma. For chemical pre-treatment, the carrier material is provided with a prime coat, and in one particularly preferred embodiment reactive prime coats are used. Prime coat materials that are suitable include, for example, reactive primers.

Figure 1:
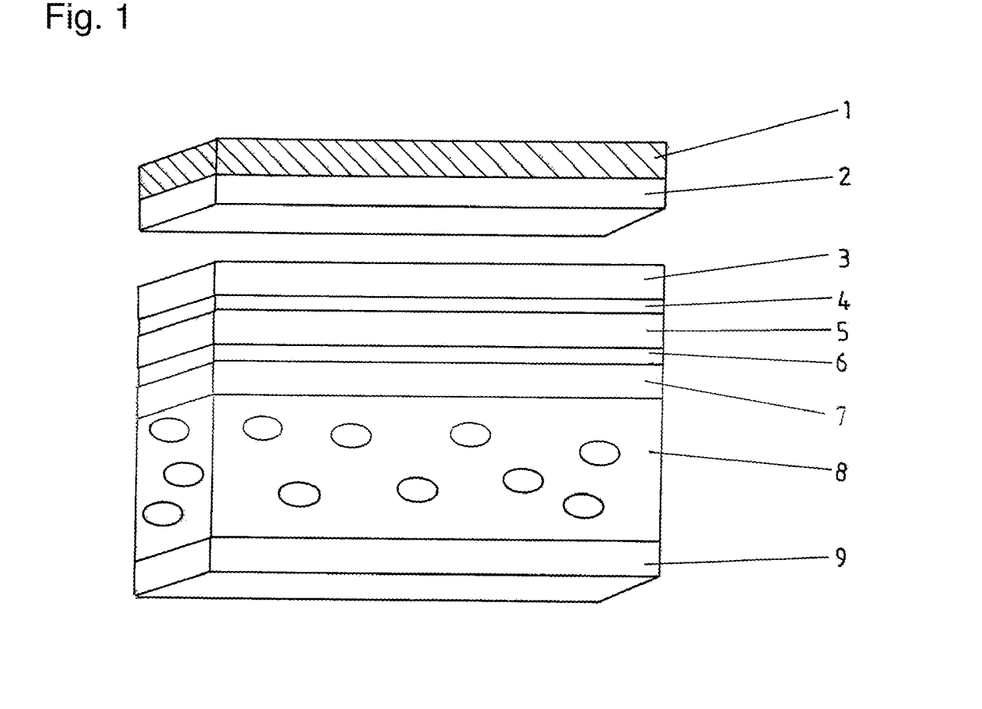
FIG. 1 illustrates the construction of a double-sided pressure-sensitive adhesive tape according to the invention.

For use as a double-sided pressure-sensitive adhesive tape for the bonding of printing plates, the PSA tape in one particularly preferred embodiment of the invention possesses the product construction in FIG. 1.

The adhesive tape is used to bond a printing plate composed of a PET-film 2 and a layer of a photopolymer 1. Layers 3 to 9 form a double-sidedly adhesive plate-mounting tape which by virtue of its foamed carrier 8 is compressible and elastic. Beginning from the side by means of which the plate is bonded, the adhesive tape is composed of the following individual sections:

3 PSA for anchoring the plate

4 the roughened top surface of the PET film 5

5 film of polyethylene terephthalate (PET)

6 the roughened bottom surface of the PET film 5

7 PSA for anchoring the foamed carrier 8 on the film of polyethylene terephthalate (PET) 5

8 foamed carrier

9 PSA for anchoring on the printing cylinder.

In the printing industry specifically it is important that the adhesive tapes employed here have a high flexibility, i.e. are able to alter their thickness to a certain extent when pressure is applied and to regain their original form when the load is removed.

It is advantageous, furthermore, if the foamed carrier 8 is composed of polyolefin(s), polyvinyl chloride (PVC) or polyurethane (PU). One particularly preferred embodiment uses foamed polyethylenes and polypropylenes. It is further preferred if the surfaces of the foamed carrier have been physically pretreated, more particularly corona-pretreated.

With further preference the polyethylene terephthalate (PET) has a thickness of 5 μm to 500 μm, preferably 5 μm to 60 μm.

Additionally the adhesive tape of the invention can be provided on one or both sides with a liner of paper or of corresponding film, more particularly a double-sidedly siliconized paper or a double-sidedly siliconized film or a silicone film, in order to ensure prolonged storage and convenient handling in the course of use.

On account of its specific properties, the double-sided adhesive tape of the invention can be used outstandingly for fixing printing plates, especially multi-layered photopolymer printing plates, to printing cylinders or sleeves.

On account of its particular configuration, particularly with the bond strengths matched to the printing plate, the adhesive tape of the invention is outstandingly suitable for bonding the printing plates to the printing cylinders. On the one hand it is possible to reposition the printing plates a number of times before printing is commenced; on the other hand, however, firm bonding of the plate during the printing operation is ensured.

The printing plate bonded using the PSA tape provided with the PSA of the invention can be removed from the PSA tape without any damage whatsoever, and in particular can also be removed without residue.

Peeling of the carrier layer of the plate, or the formation of unwanted creases in the plate during removal, do not occur. Nor are there any residues left after the adhesive tape has been removed from the printing cylinder.

The PSA of the invention is especially suitable for producing adhesive tapes which are to be used to bond, in particular, thick flexible printing plates (≧1.7 mm in thickness, preferably >2 mm in thickness). As compared with the prior art adhesive tapes for bonding printing plates, a significantly better suitability is found here, especially with respect to the edge lifting behaviour. The suitability for thin printing plates as well, of course, is also outstanding.

EXPERIMENTS

Determination of the Number-average Molecular Weight

The figures for the number-average molar mass $M_{n,P}$ and the polydispersity PD in this specification refer to the values determined by gel permeation chromatography. The determination is made on a 100 µl sample subjected to clarifying filtration (sample concentration 4 g/l). The eluent used is tetrahydrofuran containing 0.1% by volume of trifluoroacetic acid. The measurement is made at 25° C. The preliminary column used is a PSS-SDV column, 5µ, $10^3$ Å, ID 8.0 mm×50 mm. Separation is carried out using the PSS-SDV columns, 5µ, $10^3$ Å and also $10^5$ Å and $10^6$ Å each with an ID 8.0 mm×300 mm (columns from Polymer Standards Service; detection by means of Shodex RI71 differential refractometer). The flow rate is 1.0 ml per minute. Calibration is made against PMMA standards (polymethyl methacrylate calibration).

Preparation of the PSA

A 2 l glass reactor conventional for free-radical polymerizations with evaporative cooling was charged with 300 g of a monomer mixture of the composition stated in the tables for the respective example and 200 g of acetone/special boiling point spirit 60/95 (1:1). After nitrogen gas had been passed through the reactor for 45 minutes with stirring, the reactor was heated up to 58° C. and 0.15 g of 2,2'-azodi(2-methylbutyronitrile (Vazo 67®, DuPont), in solution in 6 g of acetone, was added. Subsequently the external heating bath was heated to 75° C. and the reaction was carried out constantly at this external temperature. After a reaction time of 1 hour a further 0.15 g of VAZO 67®, in solution in 6 g of acetone, was added. After 3 hours the batch was diluted with 90 g of acetone/special boiling point spirit 60/95 (1:1). After a reaction time of 5 hours 30 minutes, 0.45 g of bis(4-tert-butylcyclohexanyl)peroxydicarbonate (Perkadox 16®, Akzo Nobel), in solution in 9 g of acetone, was added. After a reaction time of 7 hours 0.45 g of bis(4-tert-butylcyclohexanyl)peroxydicarbonate (Perkadox 160, Akzo Nobel), in solution in 9 g of acetone, was added. After a reaction time of 10 hours the batch was diluted with 90 g of acetone/special boiling point spirit 60/95 (1:1). After a 24 h reaction time of 24 hours the reaction was discontinued and the batch cooled to room temperature. Thereafter the polymer was blended with the corresponding amount of tackifier resin (see tables) and with the corresponding amount of aluminium(III) acetylacetonate (3% strength solution in acetone) and the blend was diluted to a solids content of 30% with acetone/special boiling point spirit 60/95 (1:1).

Production of the Double-sided PSA Tape Assembly:

A PET film 23 µm thick and etched on both sides with trichloroacetic acid was coated with the PSAs specified in the examples and prepared as described above. After drying for 15 minutes at 120° C., in the course of which the crosslinking reaction took place, the coat weight was 30 g/m². The specimens thus coated were lined with a double-sidedly siliconized release paper. Subsequently, via a transfer carrier, a commercial acrylate PSA was laminated with a coat weight of 20 g/m² to the uncoated side of the above assembly.

In the subsequent step a polyethylene/ethylene-vinyl acetate foam with a thickness of 500 µm and a density of 270 kg/m³ was laminated on. This foam carrier was then laminated via a transfer carrier with a commercial acrylate PSA with a coat weight of 50 g/m², lamination taking place on to the uncoated side of the above assembly.

Bonding of the Printing Plates and Application:

The double-sided PSA tapes described above, with the commercial adhesive (see FIG. 1, layer 9), were adhered to a steel cylinder having a diameter of 110 mm. A printing plate from DuPont Cyrel HOS with a thickness of 2.54 mm was bonded on to the test adhesive (inventive examples or reference examples; layer 3 in FIG. 1). This steel cylinder with printing plate was subsequently installed in a printing machine; it was used for printing for 16 hours with a print setting of 150 µm. After 3-day storage at 23° C. and 50% humidity, the edge lifting of the printing plate from the double-sided PSA tape was ascertained.

Figure 2:
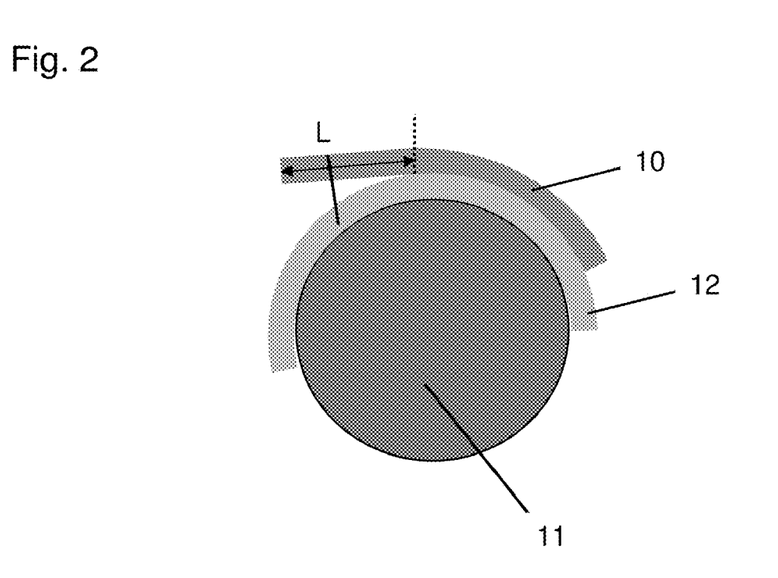
FIG. 2 illustrates a printing plate lifting off of an adhesive tape adhered to a printing cylinder.

Evaluation:

For the evaluation of the examples an observation was made as to whether, after the storage time, lifting of the flexible printing plate from the adhesive tape adhered to the cylinder was observable. A measure for the edge lifting in this case was the length L, as measured in the tangential direction, of the section of the printing plate that was no longer stuck (of the raised printing plate portion), measured from the exposed end up to the first point at which it was still bonded (cf. FIG. 2: 10=printing plate, 11=printing cylinder, 12=adhesive tape, L=length of the raised printing plate portion).

The adhesive tape behaviour was rated as successful when the edge lifting in accordance with the test described was less than 5 mm, when less than 1% residue remained on the printing plate when the printing plate was removed from the adhesive tape, and when the printing plate was not damaged on demounting.

TABLE 1

Unsuccessful comparative examples

| | | R1 | R2 | R3 |
|---|---|---|---|---|
| Acrylic acid | [% by weight] | 3.2 | 2.1 | 2.4 |
| Methyl acrylate | [% by weight] | | 7.0 | 8.0 |
| Stearyl acrylate | [% by weight] | 16.0 | | |
| N-tert-Butylacrylamide | [% by weight] | | | |
| Ethylhexyl acrylate | [% by weight] | 60.8 | 30.45 | 34.8 |
| Butyl acrylate | [% by weight] | | 30.45 | 34.8 |
| Foralyn 90 ® | [% by weight] | 20.0 | | |
| Sylvares TP 95 ® | [% by weight] | | 30.0 | |
| DT 135 ® | [% by weight] | | | 20.0 |
| Sylvares TP 7042 ® | [% by weight] | | | |
| Al chelate Initial mass of crosslinker/100 g polymer | g | 0.2 | 0.2 | 0.4 |
| Mn, P | kg/mol | 102.0 | 98.0 | 98.0 |
| V | | 1.8871 | 1.8131 | 3.6263 |
| Result | | very high edge lifting | destroys the printing plate | high edge lifting |

TABLE 2

Variation in the amount of resin and/or in the polymer composition

|  |  | B1 | B2 | B3 | B4 | B5 | B6 | B7 |
|---|---|---|---|---|---|---|---|---|
| Acrylic acid | [% by weight] | 2.4 | 2.7 | 2.6 | 2.4 | 2.25 | 2.55 | 2.4 |
| Methyl acrylate | [% by weight] | 8.0 | 9.0 | 8.5 | 8.0 | 7.5 |  | 8.0 |
| Stearyl acrylate | [% by weight] |  |  |  |  |  |  | 8.0 |
| N-tert-Butylacrylamide | [% by weight] |  |  |  |  |  | 8.5 |  |
| Ethylhexyl acrylate | [% by weight] | 34.8 | 39.2 | 37.0 | 34.8 | 32.625 | 52.7 | 30.8 |
| Butyl acrylate | [% by weight] | 34.8 | 39.2 | 37.0 | 34.8 | 32.625 | 21.25 | 30.8 |
| Foralyn 90 ® | [% by weight] |  |  |  |  |  |  |  |
| Sylvares TP 95 ® | [% by weight] |  |  |  |  |  |  |  |
| DT 135 ® | [% by weight] | 20.0 | 10.0 |  |  |  |  | 20.0 |
| Sylvares TP 7042 ® | [% by weight] |  |  | 15.0 | 20.0 | 25.0 | 15.0 |  |
| Al chelate Initial mass of crosslinker/100 g Polymer | g | 0.2 | 0.2 | 0.2 | 0.2 | 0.2 | 0.2 | 0.2 |
| Mn, P | kg/mol | 98.0 | 98.0 | 98.0 | 98.0 | 98.0 | 87.0 | 115.0 |
| V |  | 1.8131 | 1.8131 | 1.8131 | 1.8131 | 1.8131 | 1.6096 | 2.1277 |
| Result |  | successful | successful | successful | successful | successful | successful | successful |

TABLE 3

Variation of the amount of crosslinker

|  |  | B6 | B7 | B8 | B9 | B10 | B11 |
|---|---|---|---|---|---|---|---|
| Acrylic acid | [% by weight] | 2.4 | 2.4 | 2.4 | 2.4 | 2.4 | 2.4 |
| Methyl acrylate | [% by weight] | 8.0 | 8.0 | 8.0 | 8.0 | 8.0 | 8.0 |
| Stearyl acrylate | [% by weight] |  |  |  |  |  |  |
| N-tert-butylacrylamide | [% by weight] |  |  |  |  |  |  |
| Ethylhexyl acrylate | [% by weight] | 34.8 | 34.8 | 34.8 | 34.8 | 34.8 | 34.8 |
| Butyl acrylate | [% by weight] | 34.8 | 34.8 | 34.8 | 34.8 | 34.8 | 34.8 |
| Foralyn 90 ® | [% by weight] |  |  |  |  |  |  |
| Sylvares TP 95 ® | [% by weight] |  |  |  |  |  |  |
| DT 135 ® | [% by weight] | 20.0 | 20.0 | 20.0 | 20.0 | 20.0 | 20.0 |
| Sylvares TP 7042 ® | [% by weight] |  |  |  |  |  |  |
| Al chelate Initial mass of crosslinker/100 g Polymer | g | 0.1 | 0.15 | 0.175 | 0.2 | 0.25 | 0.3 |
| Mn, P | kg/mol | 98.0 | 98.0 | 98.0 | 98.0 | 98.0 | 98.0 |
| V |  | 0.9066 | 1.3599 | 1.5865 | 1.8131 | 2.2664 | 2.7197 |
| Result |  | adhesive residues | adhesive residues | successful | successful | successful | high edge lifting |

Specification of the resins:

Foralyn 90®:

Glycerol ester of partly hydrogenated rosin, softening temperature 84-92° C. (typical value 89° C.; manufacturer figure) (Eastman Chemical BV)

Sylvares TP 95®:

Terpene-phenolic resin, softening temperature 92-98° C. (typical value 95° C.; manufacturer figure) (Arizona Chemical)

DT 135®:

Terpene-phenolic resin of average polarity, softening temperature 135° C. (manufacturer figure) (DRT Resins)

Sylvares TP 7042®:

Terpene-phenolic resin, softening temperature 145-151° C. (typical value 145° C.; manufacturer figure) (Arizona Chemical)

Al chelate=aluminium(III) acetylacetonate (3% strength solution, acetone) The figure for the initial mass of crosslinker has been standardized to 100 g of polymer component in each case [corresponding to 100 g of the monomer mixture of the composition stated in the tables for the example in question (minus the resin component] Mn,P=number-average molecular weight of the polymer component $V=n_Z/n_P$ chemical-amount ratio of the amount $n_Z$ of the crosslinking-active centres of the crosslinker to the theoretical amount $n_P$ of the macromolecules of polymer component A1

The results show that the PSA of the invention is outstandingly suitable for the specified profile of requirements.

Table 1 shows 3 reference examples from the prior art which are enabled to ensure the required result. Examples R1 and R2 have resins whose softening temperature is too low. A very high level of edge lifting and/or destruction of the bonded printing plate on reattachment of the adhesive tape is observed. R3 is an example in which the crosslinker concentration selected was more than the required amount. Here again a high level of edge lifting is observed.

Table 2 shows a series of inventive examples in which in each case the resin fraction of the PSA and/or the composition of the polymer component was varied within the bounds of the invention. All of the examples show a successful result—that is they meet the profile of requirements.

Table 3 shows the variation of the amount of crosslinker added. It is observed that the examples in which the chemical amount ratio V of the amount $n_Z$ of the crosslinking-active centres of the crosslinker to the theoretical amount $n_P$ of the macromolecules of polymer component A1 is set within the required range resulting in successful outcomes. If the ratio V chosen is too low, then residues of the PSA are observed on the printing plate when the printing plate is redetached from the adhesive tape. If the values chosen for the ratio V are too high, a high level of edge lifting is observed.

The invention claimed is:

1. Composition for preparing a crosslinked pressure-sensitive adhesive, comprising
   A. a pressure-sensitive adhesive comprising
      A1). 60% to 90% by weight of a random copolymer component comprised of
         a) 5% to 25% by weight, based on the weight of the random copolymer component, of one or more monomers having at least one ethylenically unsaturated bond, the monomers being each selected such that the glass transition temperatures $T_g$ of the corresponding homopolymers are at least 0° C., some of the monomers having at least one ethylenically unsaturated bond also having at least one carboxyl group,
         b) 75% to 95% by weight, based on the weight of the random copolymer component, of acrylic esters and/or methacrylic esters which are each selected such that the glass transition temperatures $T_g$ of the corresponding homopolymers are not more than −20° C.;
      A2). 10% to 40% by weight of at least one resin component having a softening point of at least 100° C., and
   B. at least one difunctional or polyfunctional crosslinker, the at least one crosslinker being present in an amount such that the chemical-amount ratio $V=n_z/n_p$ of the amount $n_z$ of the crosslinking-active centers of the crosslinker to the theoretical amount $n_p$ of the macromolecules of the random copolymer component A1 possesses a value between 1.5 and 2.5,
   the amount $n_z$ of the crosslinking-active centers of the crosslinker being given by the mass $m_v$ of the crosslinker, divided by the molar mass $M_v$ of the crosslinker, multiplied by the number f of the crosslinking-active centers per crosslinker molecule, i.e. $n_z=f\cdot m_v/M_v$
   and the theoretical amount $n_p$ of the macromolecules of the random copolymer component A1 being given by the mass $m_p$ of the random copolymer component in the pressure-sensitive adhesive, divided by the number average molar mass $M_{n,p}$ of this component, i.e. $n_p=m_p/M_{n,p}$.

2. Composition according to claim 1, wherein the random copolymer component has a molar mass $M_{n,p}$ of between about 30 000 and about 600 000 g/mol.

3. Pressure-sensitive adhesive obtained by crosslinking the composition of claim 2.

4. Pressure-sensitive adhesive obtained by chemically crosslinking the composition of claim 1.

5. Double-sided adhesive tape for bonding flexible printing plates, comprising at least one carrier and two external layers of pressure-sensitive adhesive, wherein at least one of the external layers of pressure-sensitive adhesive is a pressure-sensitive adhesive according to claim 4.

6. Adhesive tape according to claim 5, comprising a foamed carrier and at least one stabilizing carrier on at least one side of the foamed carrier.

7. Adhesive tape according to claim 6, wherein the stabilizing carrier is a paper or a film of polyester, polyethylene terephthalate, polyethylene, polypropylene, biaxially oriented polypropylene or polyvinyl chloride.

8. Adhesive tape according to claim 7, wherein the foamed carrier is a polymer foam.

9. Adhesive tape according to claim 8 wherein said polymer foam is composed of polyurethane, polyvinyl chloride or polyolefin.

10. Adhesive tape according to claim 6, wherein the foamed carrier is a polymer foam.

11. Adhesive tape according to claim 10 wherein said polymer foam is composed of polyurethane, polyvinyl chloride or polyolefin.

12. A method for fixing multi-layered photopolymer printing plates to printing cylinders or printing sleeves which comprises fixing said printing plates with the pressure-sensitive adhesive tape of claim 5.

13. Double-sided adhesive tape for bonding flexible printing plates, comprising at least one carrier and two external layers of the pressure-sensitive adhesive of claim 4.

14. Adhesive tape according to claim 13, comprising a foamed carrier and at least one stabilizing carrier on at least one side of the foamed carrier.

15. Adhesive tape according to claim 14, wherein the stabilizing carrier is a paper or a film of polyester, polyethylene terephthalate, polyethylene, polypropylene, biaxially oriented polypropylene or polyvinyl chloride.

16. Adhesive tape according to claim 14, wherein the foamed carrier is a polymer foam.

17. Adhesive tape according to claim 16 wherein said polymer foam is composed of polyurethane, polyvinyl chloride or polyolefin.

18. A method for fixing multi-layered photopolymer printing plates to printing cylinders or printing sleeves which comprises fixing said printing plates with the double-sided adhesive tape of claim 13.

19. A method for fixing multi-layered photopolymer printing plates to printing cylinders or printing sleeves which comprises fixing said printing plates with the pressure-sensitive adhesive of claim 4.

* * * * *